(12) United States Patent
von und zu Liechtenstein et al.

(10) Patent No.: US 11,222,021 B2
(45) Date of Patent: Jan. 11, 2022

(54) TECHNIQUE FOR ACCESSING ARCHIVE DATA STORED IN RELATIONAL DATABASES THROUGH THE SAP ARCHIVE INFORMATION SYSTEM

(71) Applicants: Maximilian Ralph Peter von und zu Liechtenstein, Douglas (IM); Peter Rudolf Schoenenberger, Kreuzlingen (CH)

(72) Inventors: Maximilian Ralph Peter von und zu Liechtenstein, Douglas (IM); Peter Rudolf Schoenenberger, Kreuzlingen (CH)

(73) Assignee: BUSINESS MOBILE AG, Kreuzlingen (CH)

( * ) Notice: Subject to any disclaimer, the term of this patent is extended or adjusted under 35 U.S.C. 154(b) by 0 days.

(21) Appl. No.: 17/063,134

(22) Filed: Oct. 5, 2020

(65) Prior Publication Data

US 2021/0019322 A1    Jan. 21, 2021

(51) Int. Cl.
*G06F 16/24* (2019.01)
*G06F 16/2455* (2019.01)
*G06F 16/242* (2019.01)
*G06F 16/22* (2019.01)
*G06F 16/28* (2019.01)

(52) U.S. Cl.
CPC ........ *G06F 16/24561* (2019.01); *G06F 16/22* (2019.01); *G06F 16/2433* (2019.01); *G06F 16/24552* (2019.01); *G06F 16/284* (2019.01)

(58) Field of Classification Search
CPC ............ G06F 11/1451; G06F 11/1435; G06F 11/1469; G06F 3/0647; G06F 16/22; G06F 16/2433; G06F 16/24552; G06F 16/24561; G06F 16/284
See application file for complete search history.

(56) References Cited

U.S. PATENT DOCUMENTS

| 10,002,052 | B1* | 6/2018 | Lyadvinsky | .......... G06F 3/0619 |
| 10,152,390 | B1* | 12/2018 | Chepel | ................ G06F 11/1464 |
| 2006/0182331 | A1* | 8/2006 | Gilson | ................... G06Q 20/04 |
| | | | | 382/137 |
| 2007/0016547 | A1* | 1/2007 | Jump | .................. G06F 11/1469 |
| 2007/0050333 | A1* | 3/2007 | Vogler | .................... G06F 16/22 |
| 2008/0091894 | A1* | 4/2008 | Retnamma | .......... G06F 11/1464 |
| | | | | 711/161 |
| 2011/0235988 | A1* | 9/2011 | Leichsenring | ....... H04N 13/161 |
| | | | | 386/230 |
| 2015/0142751 | A1* | 5/2015 | Bruce | ................... G06F 16/258 |
| | | | | 707/662 |
| 2016/0210064 | A1* | 7/2016 | Dornemann | .......... G06F 16/275 |
| 2020/0183792 | A1* | 6/2020 | Shanthaveerappa | .... G06F 16/21 |

* cited by examiner

*Primary Examiner* — Merilyn P Nguyen (57) ABSTRACT

An non-transitory computer readable medium is described herein related to enhancing an SAP Archive Information System running on a SAP NetWeaver Application Server. The enhancements enable the SAP Archive Information System to query a remote relational database for archived business data. The enhancements offers multiple alternative ways of interfacing with such a database and of merging the query results obtained from such database into the SAP-standard output structures of the SAP Archive Information System.

5 Claims, 4 Drawing Sheets

TECHNIQUE FOR ACCESSING ARCHIVE DATA STORED IN RELATIONAL DATABASES THROUGH THE SAP ARCHIVE INFORMATION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

Field of the Invention

The document relates to systems, devices, methods, and related computer program products for accessing archive data through the SAP Archive Information System. More particularly, this patent specification relates to enhancements and modifications in relation to the SAP standard, that are useful in accessing archived data stored on relational databases.

Prior Art

Any discussion of the related art throughout the specification should in no way be considered as an admission that such related art is widely known or forms part of common general knowledge in the field. Unless otherwise indicated herein, the materials described in this section are not prior art to the claims in this application and are not admitted to be prior art by inclusion in this section.

The Archive Information System (AS) is a generic tool for indexing data archives that is fully integrated into the SAP data archiving environment. Data Archiving is a service provided by the SAP NetWeaver Application Server, which is part of the SAP NetWeaver platform for building business applications. Data Archiving removes mass data that the system no longer needs online, but which must still be accessible at a later date if required, from the database. The process uses archiving objects to write business documents to archive files that can be stored on other media. as the language for programming the SAP NetWeaver Application Server, which is part of the SAP NetWeaver platform for building business applications.

Standard SAP-delivered functionality can be adapted to customers' needs through SAP's enhancement framework. There are certain ways to achieve the enhancements: Core Modification, User Exits, Customer Exits, BADI (Business Add Ins), Explicit Enhancements and Implicit Enhancements.

Third party providers have developed a business models around innovating around the SAP Standard in order to find new and useful ways of adapting the SAP-delivered product to customers' needs. Those third-party providers tend to market and sell their innovations as packages of Enhancements.

The Archive Information System (AS) allows a user to search for archived data through an index. The index is a table of an Archive Infostructure. An Archive Infostructure is a structure comprising key fields, whereby the key fields relate to business data, e.g. the document number of a document in financial accounting. Every ADK-format file accessed using AS is accessed through Archive Infostructure. Every Archive Infostructure belongs to a unique Archiving Object and also refers to a Field Catalog. A Field Catalog is the collection of fields suitable for indexing the ADK-format archive files of the Archiving Object concerned. Every key in the index maps to an archive object on a one to one basis. An archive object comprises table rows from multiple tables of business data, where there are normally foreign key relationships between such tables of business data. The index itself does not contain all of the data of the archive object. An archive object is normally inserted into an ADK-format file stored on an external content server. The primary purpose of the index is to link a key of the index to the ADK-format file which contains the archive object and also to link to the offset in the file which marks the start location of the archive object. Without the index it would require a sequential search through the entire repository of ADK-format files in order to find an archive object. Therefore, the index allows faster access to archive data which is stored in data-compressed files, such as the described ADK-format files.

SUMMARY

The current state of the art in SAP Netweaver related archiving revolves around moving old data into compressed files which are then stored in a file storage system. The main reason for moving data out the productive database and into a file-based system is that such database space is expensive and having too much old data in such a database inevitably slows down the performance of queries in the day to day operational side of the business. At the time the AS was conceived file-based storage of data was still many orders of magnitude cheaper than storing the same amount of data in a relational database.

The present inventor has realized that the price of relational database storage can be projected to come down very significantly in future years. Hence it is desirable, in principle, to store archived data not in a file, but in a database table. On of the advantages of storing SAP business data in a relational archive database is that it is possible to use the same database schema as the productive database. The data can therefore be stored in tables and rows, capable of being indexed and queried, much like the productive database. An added advantage is that database archives are transparent, in the sense that the data is obscured by encryption or compression. File-based storage on an SAP system commonly involves files of ADK-format. ADK is a proprietary format of SAP SE. Data which is stored in ADK-files can only be read by SAP SE proprietary software because it is compressed with a proprietary and unpublished algorithm. This is a disadvantage for a customer, because if SAP SE should ever go out of business, it is not guaranteed that archived data can still be read, taking into account that the only available ADK-format file readers require a full-licensed operative SAP system such as SAP ERP or SAP S/4HANA.

There are third-party service providers who offer to offload aged business data from a productive SAP system to an archive database. However, these providers generally face the problem that no SAP Standard tools exist to integrate with such databases. An example is the standard SAP-Transaction FBL3N in the module FI. FBL3N is a standard program with which a user can search for financial accounting documents. FBL3N also has an interface to the AS, thereby permitting a user to extend the search to archived documents. Crucially the user is presented with the same familiar user interface, as when for searching for documents in the live productive database. Also, many other standard SAP-Transactions interface with the AS in the same way and thus allow searching for archived business data. Hence a significant disadvantage that is facing third-party providers of relational database-based approaches is that they have to provide a separate and proprietary user interface to view and retrieve such archived data.

The present inventor has realized that it would be desirable to allow an SAP user to view data which is archived on a relational database through the AL interface. Therefore, a user would be unable to tell the difference between documents retrieved from ADK files through AL and documents loaded from a relational archive database.

The present inventor has also realized that such an approach would have the added benefit that the AS would no longer have to maintain an index table. It is desirable that when archiving aged data that 100 percent of that data is moved to external storage. The SAP-standard AS, however, still keeps a significant portion of that data in the index table. It is possible to exclude the index table, but then access times for archived data would be unacceptably slow. In order to search for a single document, potentially all ADK-files have to be searched for that record sequentially. This is a task that could take hundreds of days on a typical archive for a large corporation. The present invention includes an approach to the problem which allows to make fast, indexed queries an external relational database for archived data, whilst at the same time leaving the way application programs use the AS entirely unchanged. The new approach eliminates the need for an archive index on the productive system.

In order to implement a solution to the problem, the present inventor had to overcome the conceptual problem of how an interface solely designed to retrieve data from file-based media can be used to return the requested data from a relational database instead.

The solution found by the present inventor involved enhancing the SAP-standard, with a series of code insertions, in such a way that data from relational archive databases is returned in addition to the data normally returned by AS. The desired outcome therefore was to keep the SAP-standard methods of data retrieval entirely intact and that query results from relational archive databases are merely added.

In particular embodiments local class LCL_ASIT_RANGES is enhanced in such a way that the constructor conducts a query on a remote data store of archive data in relational format. The query results are then stored in a local buffer and become appended to any results that the SAP-standard implementation may find. An innovative enhancement of the IF_AS_ITERATOR~NEXT method comprises encapsulating the standard code with a TRY/CATCH error handler in such a way that when an error is raised because no more data is available using the standard implementation, then in the CATCH handler more data may be retrieved from the local buffer that has been populated with the enhancement of the constructor method. Such implicit enhancements of local class LCL_ASIT_RANGES may thus be considered a best mode to practice the instant invention. However, those skilled in the art will realize that other variations of enhancing the SAP-standard are also possible in order to reach the same result.

There has thus been outlined, rather broadly, some of the features of the disclosed technique for accessing archive data through the SAP Archive Information System in order that the detailed description thereof may be better understood, and in order that the present contribution to the art may be better appreciated. There are additional features of the technique that will be described hereinafter and that will form the subject matter of the claims appended hereto. In this respect, before explaining at least one embodiment of the technique in detail, it is to be understood that the technique is not limited in its application to the details of construction or to the arrangements of the components set forth in the following description or illustrated in the drawings. The technique is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

The current state of the art in SAP Netweaver related archiving revolves around moving old data into compressed files which are then stored in a file storage system. The main reason for moving data out the productive database and into a file-based system is that such database space is expensive and having too much old data in such a database inevitably slows down the performance of queries in the day to day operational side of the business. At the time at which the SAP Archive Information System (AS) was first conceived, file-based storage of data was still many orders of magnitude cheaper than storing the same amount of data in a relational database. Hence the majority of archiving frameworks in the prior art, AS amongst them, provides a solution for transposing relational tables into sequential files and then provide a series of tool in order to be able to search and retrieve data contained therein.

Figure 1:
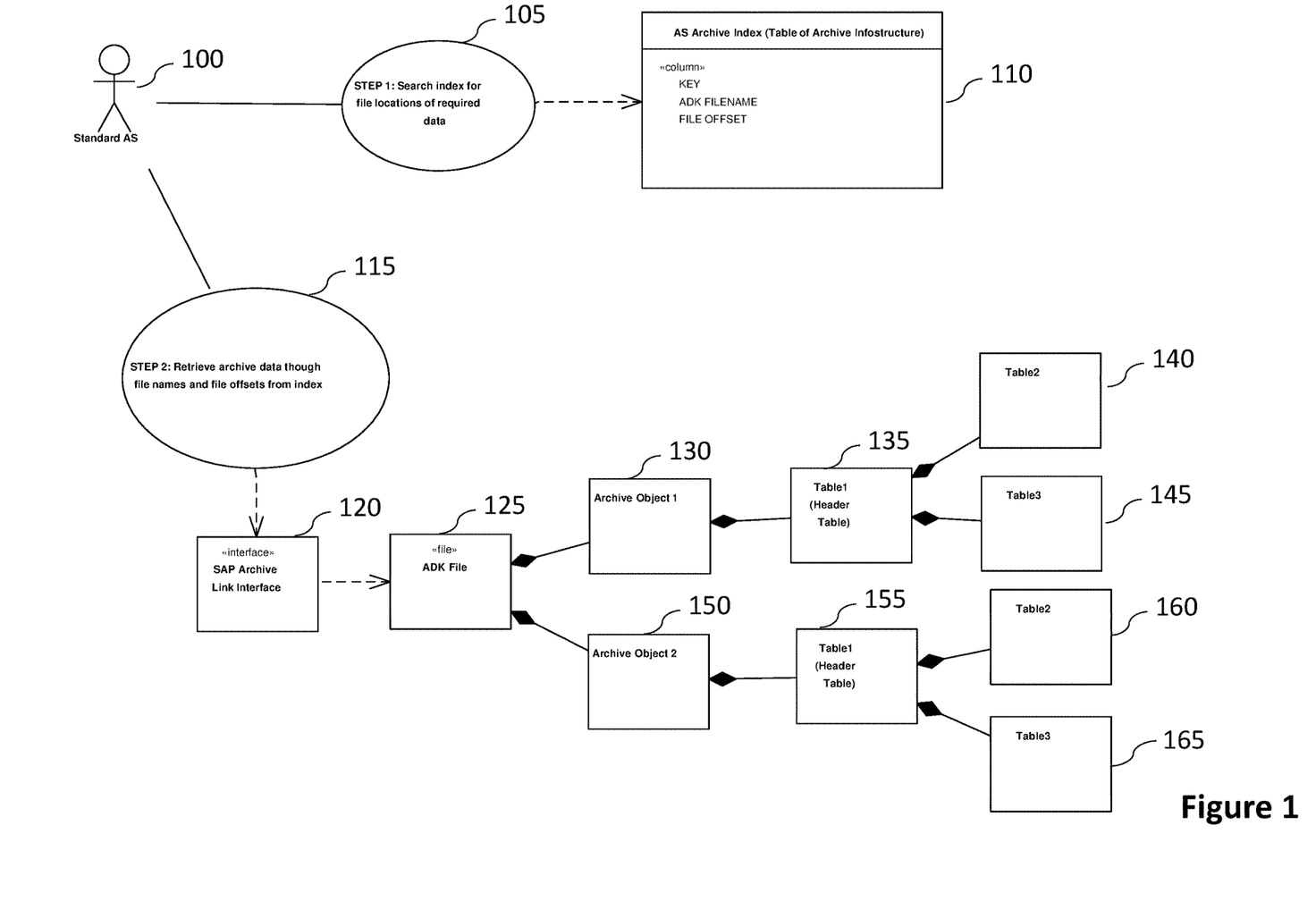
FIG. 1 illustrates the architecture of standard AS functionality.

FIG. 1 depicts the core functionality of the prior-art standard implementation of AS 150. The scenario could be that a standard SAP Transaction is used to search for a document in financial accounting, for example. An SAP Transaction is known to be an application program in a SAP system with a user interface that is, most commonly, executed through a client, such as SAP GUI or a web client, such SAP Fiori Launchpad. A typical SAP Transaction for such a scenario would be FBL3N, which is an application that allows searching for financial documents both in the production database and the ADK file-based archive data repository. The AS provides a standard interface for all such archive data and as such AS is used by many SAP Transactions for providing a unified and shared gateway to archive repositories. Whenever AS 150 receives a request for archive data, the first step 105 is to query an index 110. The index 110 is a table of an Archive Infostructure. An Archive Infostructure is a structure comprising key fields, ADK filenames and file offsets. The key field relates to business data, e.g. the document number of a document in financial accounting or the name of a customer. The key comprises the fields that are useful for searching for an archive object. In the second step 115 archive data is retrieved through file names and file offsets from the index 110. So, whereas step 1 is essentially a data search operation, step 2 is the data retrieval operation. Step 2 relies on the precondition that the files names and sequential offsets inside the ADK-format files are known in order to effect direct access on the corresponding archive objects. Normally such ADK-formats files are stored an external system with an SAP ArchiveLink-certified content server, which in turn is accessed through the SAP ArchiveLink interface 120. Once a requested ADK-format file 125 is being processed, it becomes possible to extract the selected archive objects contained therein by direct access. So, if for example the index query of step 1 has identified two archive objects 130 and 150 as query results, then the system first finds ADK-format file 125, which contains Archive Object 1 130 and archive object 150, wherein Archive Object 1 contains a single header row of table 1 135, and potentially several rows each of dependent tables 2 140 and 3 145. Similarly, in the depicted example, Archive Object 2 150 contains one row of header table 1 155 and potentially several rows each of tables 2 160 and 165.

It is important to distinguish, in terms of terminology, between an Archiving Object and an archive object. Archiving Objects, as understood in the context of SAP Transaction SARA, are definitions of business objects in an archiving scenario. Archiving Objects can be linked to tables in the productive database by SAP-Transaction SARA. An example of a SAP-standard Archiving Object is FI_DOCUMNT, which is useful for archiving financial documents. Archiving Object FI_DOCUMNT is linked to several table, including tables BKPF and BSEG. The links can be viewed though SAP-Transaction DB15, which is accessible through SAP-Transaction SARA. The term archive object is defined herein as the main content of an ADK-format archive file, wherein an ADK-format file can store any number of archive objects. Each ADK-format file relates to only one Archiving Object. As an example, when archiving financial accounting documents, normally the Archiving Object FI_DOCUMNT is selected in SAP-Transaction SARA. SAP-Transaction SARA then writes one or more ADK-format archive files, each of which contain one or more archive objects. An Archiving Object therefore is a definition of an archive object, where an ADK-format file may contain many archive objects, all of which associated with a single Archiving Object. An archive object normally contains one single row of a header table, such as one row from table BKPF in the FI_DOCUMNT example. An archive object furthermore normally contains one or more rows from one or more secondary tables. Every key in the index maps to an archive object on a one to one basis. An archive object comprises table rows from multiple tables of business data, where there are normally foreign key relationships between such tables of business data. The index itself does not contain all of the data of the archive object. An archive object is normally inserted into an ADK-format file stored on an external content server. The primary purpose of the index is to link a key of the index to the ADK-format file which contains the archive object and also to link to the offset in the file which marks the start location of the archive object. Without the index it would require a sequential search through the entire repository of ADK-format files in order to find an archive object. Therefore, the index allows faster access to archive data which is stored in data-compressed files, such as the described ADK-format files.

The present inventor has realized that the price of relational database storage can be projected to come down very significantly in future years. Hence it is desirable, in principle, to store archived data not in a file, but in a database table. One of the advantages of storing SAP business data in a relational archive database is that it is possible to use the same database schema as the productive database. The data can therefore be stored in tables and rows, capable of being indexed and queried, much like the productive database. An added advantage is that database archives are transparent, in the sense that the data is obscured by encryption or compression. File-based storage on an SAP system commonly involves files of ADK-format. ADK is a proprietary format of SAP SE corporation. Data which is stored in ADK-files can only be read by SAP SE proprietary software because it is compressed with a proprietary and unpublished algorithm. This is a disadvantage for a customer, because if SAP SE corporation should ever go out of business, it is not guaranteed that archived data can still be read, taking into account that the only available ADK-format file readers require a full-licensed operative SAP system such as SAP ERP or SAP S/4HANA.

There are third-party service providers who offer to offload aged business data from a productive SAP system to an archive database. However, these providers generally face the problem that no SAP Standard tools exist to integrate with such databases. An example is the standard SAP-Transaction FBL3N in the module FI. FBL3N is a standard program with which a user can search for financial accounting documents. FBL3N also has an interface to the AS, thereby permitting a user to extend the search to archived documents. Crucially the user is presented with the same familiar user interface, as when for searching for documents in the live productive database. Also, many other standard SAP-Transactions interface with the AS in the same way and thus allow searching for archived business data. Hence a significant disadvantage that is facing third-party providers of relational database-based approaches is that they have to provide a separate and proprietary user interface to view and retrieve such archived data.

The present inventor has realized that it would be desirable to allow a SAP user to view data which is archived on a relational database through the AL interface. Therefore a user would be unable to tell the difference between documents retrieved from ADK files through AL and documents loaded from a relational archive database.

The present inventor has also realized that such an approach would have the added benefit that the AS would no longer have to maintain an index table. It is desirable that when archiving aged data that 100 percent of that data is moved to external storage. The SAP-standard AS, however, still keeps a significant portion of that data in the index table. It is possible to exclude the index table, but then access times for archived data would be unacceptably slow. In order to search for a single document, potentially all ADK-files have to be searched for that record sequentially. This is a task that could take hundreds of days on a typical archive for a large corporation. The present invention includes an approach to the problem which allows to make fast, indexed queries an external relational database for archived data, whilst at the same time leaving the way application programs use the AS entirely unchanged. The new approach eliminates the need for an archive index on the productive system.

In order to implement a solution to the problem, the present inventor had to overcome the conceptual problem of how an interface solely designed to retrieve data from file-based media can be used to return the requested data from a relational database instead.

The solution found by the present inventor involved enhancing the SAP-standard, with a series of code insertions, in such a way that data from relational archive databases is returned in addition to the data normally returned by AS. The desired outcome therefore was to keep the SAP-standard methods of data retrieval entirely intact and that query results from relational archive databases are merely added.

Figure 2:
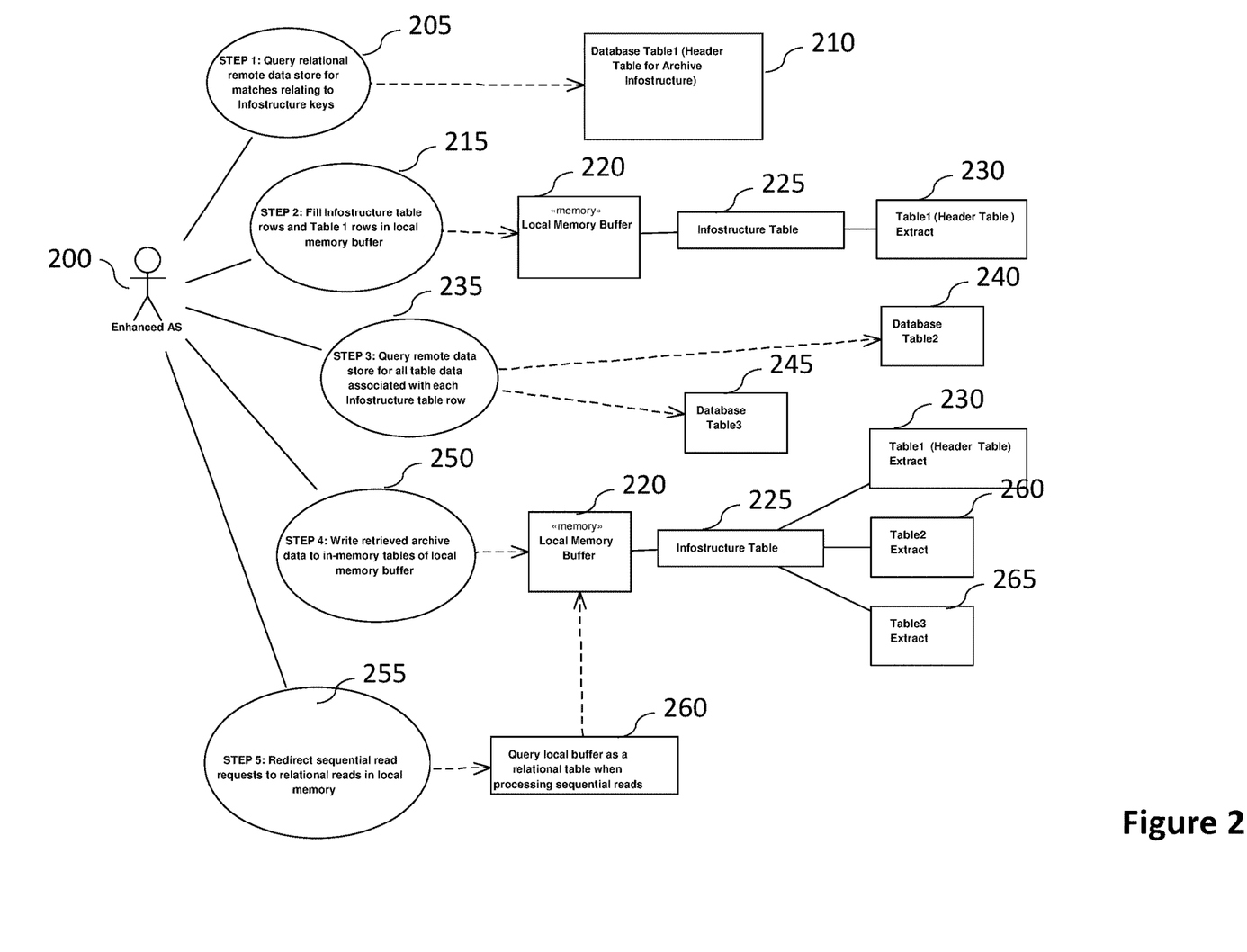
FIG. 2 illustrates the architecture of enhanced AS functionality, according to an example embodiment.

FIG. 2 illustrates an example of an enhanced AS 200. It has to be emphasized that the steps described hereinafter normally are executed in addition the standard functionality. Hence one of the contributions to the art by the present inventor is that existing functionality of the AS interface is preserved whilst also permitting data retrieval from relational archive data sources. When archive data is queried through the AS this is done on the basis of keys fields of an Archive Infostructure, as far as the query parameters are concerned. Step 1 205 involves that a relational remote data store is queried for matches relating to Archive Infostructure keys. In the prior art the query would be run on the corresponding Archive Infostructure index table. In an embodiment of the present invention the index table may be empty and the query is run on an remote relational archive database. The query on the remote database is run either against a view whereby the view is modelled on the Archive Infostructure, or alternatively the query may be run directly against a table, such as Database Table 1 210, whereby the table is the header table of a corresponding Archive Infostructure. It is necessary to provide a mapping between the Archive Infostructure on which the AS query is based, and the corresponding entity on the relational database. Therefore, an Archive Infostructure or an Archiving Object may be mapped to either a table, a view or any other equivalent artifact on the remote archive database. What is also possible is to ensure by adhering to a naming convention that no mapping is necessary. Therefore, if the Archive Infostructure were to be name ZARIXFI1, for example, then it would suffice if the corresponding entity on the remote database were to a be view with the same name ZARIXFI1 and the same key fields. However, in a preferred embodiment, a mapping is used and the header table corresponding to an Archiving Object is queried directly. So, if the Archive Infostructure was ZARIXFI1 for financial accounting documents, then there is a mapping to table BKPF, for example, whereby BKPF is the SAP-standard header table for financial accounting documents. The reason why direct table access is preferred over a view access is increased efficiency. In the SAP standard first the index table is queried and secondly the underlying table data is retrieved, including the header table. In a file-based archiving system, such a two-pronged approach is inevitable as the process is intrinsically inefficient. However, when being able to directly query a relational archive database, then the steps of querying for a record set of archive objects and reading data from said archive objects may be advantageously combined. Therefore, rather than first querying an Archiving Infostructure-like view for a result set and then querying a header table for data, it is better to just make one query and therefore query the header table both for the result set and for the header data simultaneously.

In step 2 215 Archive Infostructure table rows are filled in a local memory buffer. In order to achieve this goal, the data which has been retrieved from the remote archive database needs to be moved into corresponding tables in local memory buffers. In a preferred embodiment a header row is retrieved from a header table on the remote archive database. The data contained in this header row is then moved both to a row of the corresponding Archive Infostructure table and to a row in an internal table corresponding to the remote header table. In an ABAP environment it is possible to take the structure which corresponds to the header row of the remote database table and then use a MOVE-CORRESPONDING statement to move the relevant data to both the Infostructure Table 255 and the Table 1 extract 230 in the local memory buffer 220.

Step 3 235 involves querying a remote data store for all table data associated with each Archive Infostructure table row. This step encompasses querying one or more tables associated with the Archiving Object. The respective key relationships may be stored in a suitable data structure for mapping key relationships between the header table and the dependent tables of the same Archiving Object. In the depicted example database table 2 240 and database table 3 245 are associated with foreign key relationships to the header table 230.

Step 4 250 involves writing retrieved archive data to the corresponding internal tables in local memory buffer 220. The figure illustrates that in the local memory buffer, now table 2 extract 260 and table 3 extract 265, both derived from database table 2 240 and database table 3 245, have been added. The local memory buffer 220, may be implemented in variety of ways suitable for storing internal tables in memory. In a preferred embodiment the local memory buffer 220 is implemented as a function group, wherein the tables are stored as internal tables declared in the top-include. In alternative embodiments the tables may be stored in ABAP Memory or Shared Object Memory. Those skilled in the art will realize that there are more ways of storing table data in a memory buffer.

Step 5 255 involves an inventive departure over the prior art in that sequential read requests, for reading archive objects in an ADK-format file-based storage, are redirected to relational reads in local memory. In this way a local memory buffer 260 is queried as a relational table when processing sequential reads.

Figure 3:
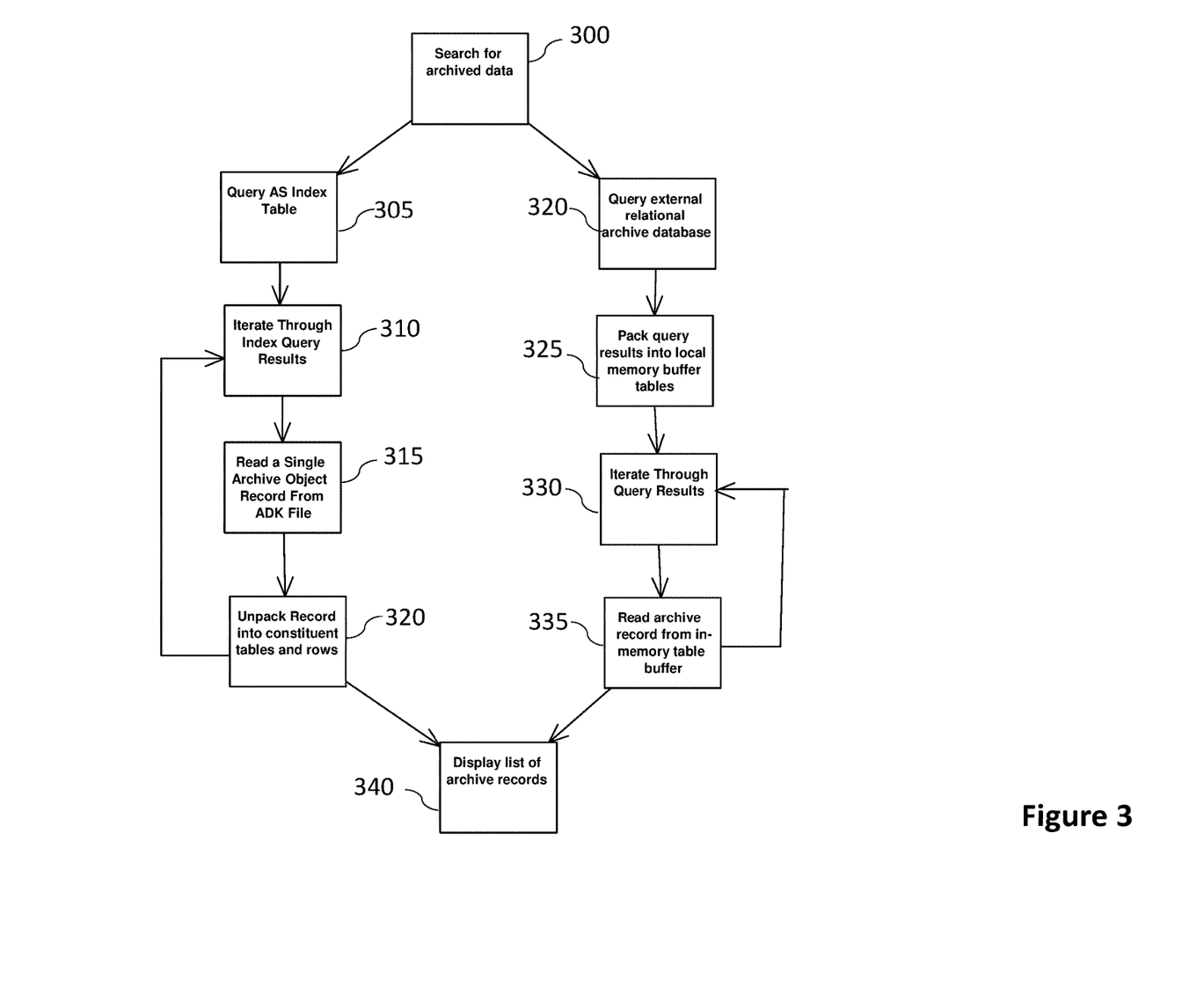
FIG. 3 illustrates the control flow of both standard AS searches and enhanced AS searches, according to an example embodiment.

FIG. 3 illustrates how a search for archived data 300 is processed from a sequential point of view. The search 300 forks into two separate branches, of which 305 and 320 are the respective entry points. The branch starting with 320 represents novel functionality which has been introduced with the present invention. The branch starting with 305 on the other hand includes elements known to the prior art. When conducting a search 300, the branches can be executed separately, or in combination. Therefore, it is possible that an archive search includes just ADK-format archive files, or just a relational archive database, or both. Element 305 relates to the index AS table being queried. The result of this query is a list of archive objects, each of which with a known file location and a known start offset within that file. In the next step 310 an iteration loop is commenced which loops through the list obtained in the previous step 305. Step 315 involves reading a single archive object record from the ADK-format file. The following step 320 unpacks that record into constituent tables and rows. The table extracts which have been derived in this way can then be displayed on a user interface, or used in other ways, as is depicted with step 340.

The second branch starts with querying of an external relational archive database 320. This querying can just be used to populate in an in-memory index table, or it can encompass bringing back also the underlying tables of the Archiving Object. The query results are then packed into internal tables stored in a local memory buffer, as is depicted in step 325. When a list of archive records is requested 340, for display purposes for example, a loop is started to iterate through the query results 330. Each pass through the loop reads an archive object record from the in-memory table, as is depicted in step 335.

Figure 4:
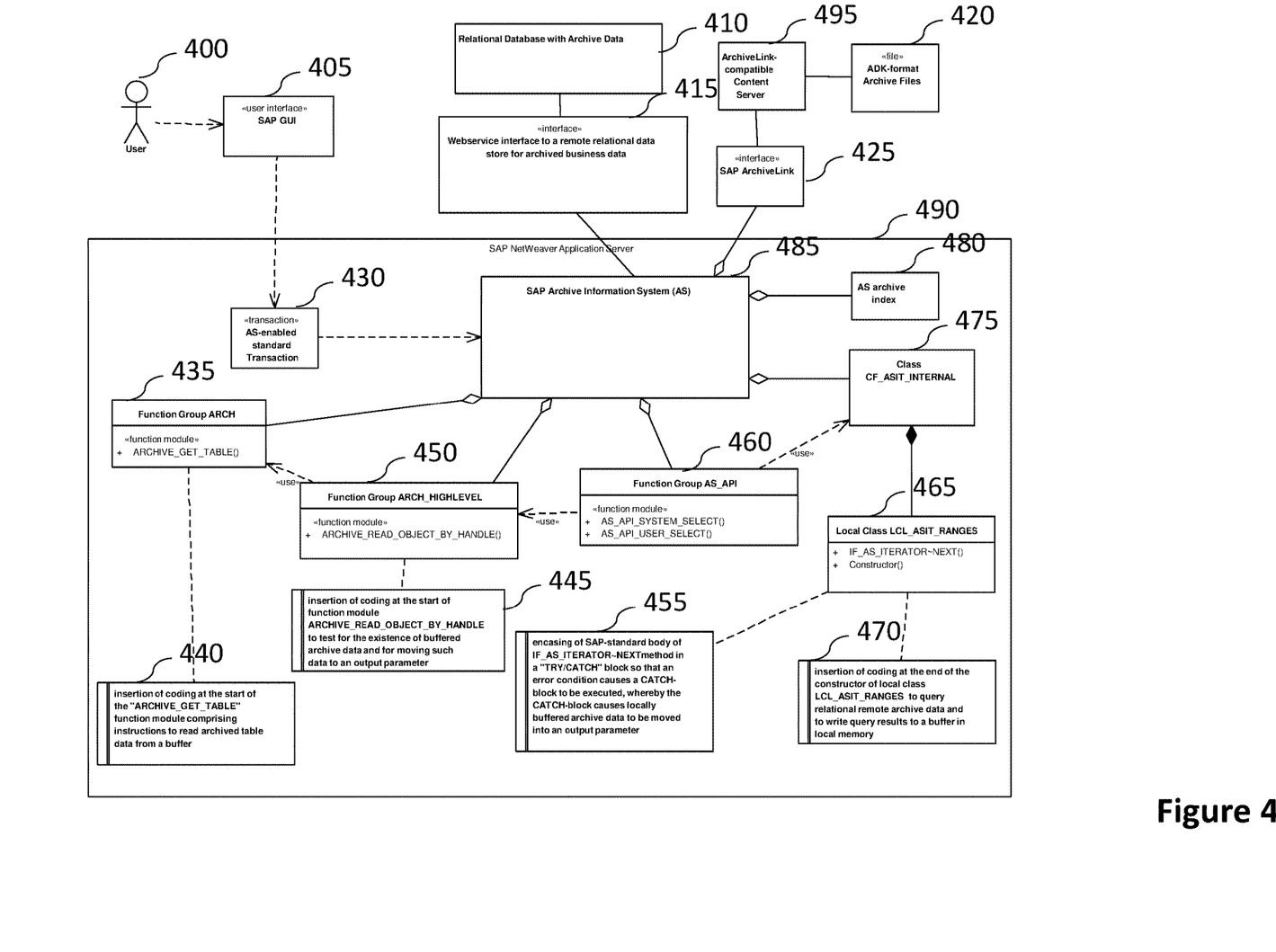
FIG. 4 is a system diagram depicting the main components of the enhanced AS, according to an example embodiment.

FIG. 4 is a system diagram which depicts a preferred embodiment of the present invention. It details which enhancement options can be used, so that the processes illustrated in the previous sections may be implemented in an advantageous manner. The central point of entry is the SAP Archive Information System (AS) 485 which is hosted by a SAP Netweaver Application Server 490. Each AS is associated with one or more AS archive index tables 480. The AS can used in various ways, one of the most common ways of using AS is to query it from an AS-enabled standard SAP-Transaction 430. That way a user 400 can use a SAP GUI 405, or a similar client capable of interfacing with SAP Netweaver Application Server 490, in order to execute such an AS-enabled standard SAP-Transaction 430. The highest-level entry point to SAP AS for such SAP-Transactions or SAP programs or SAP reports normally is in the Function Group AS_API 460. Function Group AS_API comprises Function Modules AS_API_SYSTEM_SELECT and AS_API_USER_SELECT. The enhancements to the SAP-Standard codebase described hereinafter occur downstream of these function modules. Downstream in this sense means that the enhancements are executed at some point further down in the call-stack. In a preferred embodiment function module AS_API_SYSTEM_SELECT causes, directly or indirectly, for class CF_ASIT_INTERNAL 475 to be instantiated, which in turn causes local class LCL_ASI_RANGES 465 to be instantiated. At the time of instantiation, the constructor method is executed. In a preferred embodiment coding is inserted at the end of the constructor method by means of implementing an implicit enhancement 470. The insertion of coding comprises querying remote relational archive data and writing query results to a buffer in local memory. In a preferred embodiment the enhancement comprises the following procedures: checking if the data requested through parameter IM_RANGES has already matching data in the local memory buffer, if so then no query to the remote relational archive database is required and the buffered data is used instead; checking the value of parameter IM_INFOSTRUC, wherein said parameter denotes the Archive Infostructure on which basis the query is performed, and dependent on the value of IM_INFOSTRUC conducting a mapping operation, wherein the mapping associates one or more table queries with an Archive Infostructure; and moving the query results from a query to a remote relational archive database to an internal table, wherein the Infostructure table is of a type that is associated with parameter IM_INFOSTRUC. In an inventive departure the present inventor utilizes the standard fields ARCHIVEKEY and ARCHIVEOFS in a novel and useful way. In normal usage the field ARCHIVEKEY is associated with the file name of an ADK-format archive file and the field ARCHIVEOFS relates to the offset of the archive object in question within that file. When later processing steps iterate through the Infostructure table, these processing steps need to know whether the current row relates to data from an ADK-type archive file, or from relational archive data from the remote database. In order to solve this problem, the present inventor is assigning a value of 0 to the field ARCHIVEOFS in each row that is from the relational archive database. A value of 0 cannot occur as an ADK-file offset, because the position of 0 is always reserved for the header in the ADK-file format. The offsets of archive objects therefore must always have a value greater than 0. Hence an offset artificially set to 0 can be used to indicate to later processing steps that the row in question is related with data obtained from a remote relational archive database. Those skilled in the art will realize that other values than 0 may be used alternatively, the only important requirement is that the value chosen must not be one that can occur naturally as an offset for a data object in an ADK-format file. It is also possible to use other ways of marking an entry in the Infostructure table as being derived from the remote relational archive database. For example a new field could be appended to the Infostructure table and that field could be designated as a flag-type indicator for the origin of the data. It would also be possible, for example, to re-purpose a field other than ARCHIVEOFS to serve as the required indicator of origin.

In a preferred embodiment, local class LCL_ASIT_RANGES 465 is also subject to an implicit enhancement of method IF_AS_ITERATOR~NEXT 455. This enhancement involves encasing the SAP-standard body of method IF_AS_ITERATOR~NEXT in a TRY/CATCH block in such a way that an error condition causes the CATCH-block to be executed, whereby the CATCH-block causes locally buffered archive data to be moved into an output parameter.

Function Group ARCH_HIGHLEVEL 450 is being used by Function Group AS_API 460 and can therefore be considered downstream thereof. The Function Group comprises Function Module ARCHIVE_READ_OBJECT_BY_HANDLE. An preferred embodiment involves inserting coding at the start of the Function Module to test for the existence of buffered archive data and for moving such data to an output parameter 445. The preferred embodiment accomplished said insertion of coding by an implicit enhancement, and furthermore it includes instruction to check for buffered table date and when such data exists to then retrieve it by calling subroutine ARCHIVE_GET_TABLE, which in turn calls Function Module ARCHIVE_GET_TABLE further downstream. Function Module ARCHIVE_GET_TABLE is attached to Function Group ARCH 435. A preferred embodiment involves an insertion of coding in the form of an implicit enhancement at the start of Function Module ACHIVE_GET_TABLE 440. This implicit enhancement comprises instructions to read archived table data from a local memory buffer, fill the TABLE output parameter with the buffered table data and exit the function module before any of the SAP-Standard implementation of the same can be executed.

In order to facilitate the querying of a remote relational archive database 410 it is necessary to provide an interface to the same. In order to facilitate interfacing with such a remote database a SOAP-based webservice 415 is used in a preferred embodiment. Those skilled in the art will realize that many different ways of connecting to such a remote database, a SOAP-based webservice being just one of many such possibilities. Possible alternatives include REST-based service such as OData, or through RFC-type remote procedure calls. The remote relational archive database 410 may be any type of relational data store. A preferred embodiment is implemented with a Microsoft SQL Server 2019 database, where there are tables which essentially correspond to the schema used on the productive SAP system from which the archived data originates. Furthermore, there may be views which essentially correspond to Archive Infostructures on the productive SAP system.

A SAP-standard deployment of AS normally also involves an ArchiveLink-compatible content server 495 which is queried by AS through the SAP ArchiveLink interface 425. The content server 495 allows to store ADK-format archive files 420 as well as other documents and data from a productive SAP system.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the diagrams, scenarios, and flow charts in the figures and as discussed herein, each block and/or communication can represent a processing of information and/or a transmission of information in accordance with example embodiments. Alternative embodiments are included within the scope of these example embodiments. In these alternative embodiments, for example, functions described as blocks, transmissions, communications, requests, responses, and/or messages can be executed out of order from that shown or discussed, including substantially concurrent or in reverse order, depending on the functionality involved. Further, more or fewer blocks and/or functions can be used with any of the diagrams, scenarios, and flow charts discussed herein, and these diagrams, scenarios, and flow charts can be combined with one another, in part or in whole.

A block that represents a processing of information can correspond to circuitry that can be configured to perform the specific logical functions of a herein-described method or technique. Alternatively or additionally, a block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk or hard drive or other storage medium.

The computer readable medium can also include non-transitory computer readable media such as computer-readable media that stores data for short periods of time like register memory, processor cache, and random access memory (RAM). The computer readable media can also include non-transitory computer readable media that stores program code and/or data for longer periods of time, such as secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device. Moreover, a block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Definitions and Clarifications

Herein below are a few definitions and clarifications. As used herein: The terms "a" and "an", when modifying a noun, do not imply that only one of the noun exists.

The term "comprise" (and grammatical variations thereof) shall be construed broadly, as if followed by "Without limitation". If A comprises B, then A includes B and may include other things.

The term "e. g." means including without limitation. The fact that an "example" or multiple examples of something are given does not imply that they are the only instances of that thing. An example (or a group of examples) is merely a non-exhaustive and non-limiting illustration.

The term "include" (and grammatical variations thereof) shall be construed broadly, as if followed by "Without limitation".

The term "or" is an inclusive disjunctive. For example "A or B" is true if A is true, or B is true, or both A or B are true.

A parenthesis is simply to make text easier to read, by indicating a grouping of words. A parenthesis does not mean that the parenthetical material is optional or can be ignored.

The invention claimed is:

1. A computer-implemented method for performing a joint serial-access and relational-access archive search through a single interface, the method comprising:

receiving a search request for archive objects, wherein said archive objects are instances of an archiving object, wherein an archiving object is a business object which comprises a plurality of tables linked to a single header table and wherein said business object is linked to an archive infostructure, wherein an archive infostructure is a structure which comprises a primary key, an identifier for an archive file and an offset within said archive file;

sending a first query to a database, wherein said first query comprises said search request and wherein said query is a relational query, wherein said first query comprises one or more keys from said archive infostructure, and wherein said first query is targeted at a database table and wherein said database table is a header table of said archive infostructure;

sending a second query to an archive index, wherein said second query comprises said search request and wherein said archive index is a table wherein said table comprises one or more rows of said archive infostructure;

filling an in-memory table with results of said first query and with results of said second query, wherein said in-memory table is a table of said archive infostructure; and enriching an offset field in said in-memory table with a pseudo value for all rows which originate from the results of said first query.

2. The computer-implemented method of claim 1, further comprising:

invoking a plurality of database queries, wherein each constituent table of said archiving object is queried on said database with one or more keys from said archive infostructure.

3. A computer-implemented method for transforming sequential read requests to relational reads, the method comprising:

receiving an archive query, wherein said archive query relates to an archiving object and wherein said archive query comprises at least one parameter with a key/value pair;

querying a relational archive database with said parameter and, in response, receiving a first query result;

querying an archive index with said parameter and, in response, receiving a second query result wherein said second query result comprises one or more locations, wherein a location comprises a file name of an archive file and an offset for an archive object, wherein said archive object is comprised in said archive file;

instantiating an in-memory table wherein said in-memory table has a same schema as an archive infostructure;

copying data from the first and second query results to the in-memory table in such a way, that for each copied row data is copied for fields having an identical name in both source and target tables;

receiving a request for an archive object wherein said request comprises a key for a row of said in-memory table; and querying each of linked tables of said archiving object on said relational archive database with said key.

4. A computer-implemented method for translating a serial-access archive query to a relational database query, the method comprising:

receiving a search request for an archive object, wherein said search request comprises one or more query parameters;

querying a relational archive database with said one or more query parameters and receiving a first result set;

querying an archive index table with said one or more query parameters and receiving a second result set wherein each row of said archive index table comprises:

a primary key of a header table for said archive object and a link to an offset in an archive file;

combining the first result set and the second result set into a joint result set, wherein the joint result set comprises a key field, wherein said key field is designating a key of an archive file and an offset field, wherein said offset field relates to a start position of an archive object in terms of serial file access within an archive file, wherein said combining comprises:

for the first result set:

assigning a pseudo offset value to said offset field, wherein a pseudo offset value is defined as value which does not relate to a start position of said archive object, for the second result set:

assigning an identifier of an archive file to said key field, and assigning an offset within an archive file to said offset field.

5. The computer-implemented method of claim 4 further comprising:

receiving an archive object retrieval request, wherein said request comprises a key of said archive object;

and, in response to said request:

returning a data set from said relational archive database wherein said data set comprises data from all constituent tables of said archive object.

* * * * *